(12) United States Patent
Sharma

(10) Patent No.: US 7,531,007 B2
(45) Date of Patent: May 12, 2009

(54) SECURITY APPARATUS USING A TELECOMMUNICATION DEVICE

(75) Inventor: Bettadapura Srinath Sharma, Vista, CA (US)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 703 days.

(21) Appl. No.: 10/886,420

(22) Filed: Jul. 6, 2004

(65) Prior Publication Data
US 2006/0010504 A1    Jan. 12, 2006

(51) Int. Cl.
*G08B 13/00*    (2006.01)
(52) U.S. Cl. .................. 726/35; 340/531; 340/532; 340/691.1
(58) Field of Classification Search .......... None
See application file for complete search history.

(56) References Cited

U.S. PATENT DOCUMENTS

| | | | | |
|---|---|---|---|---|
| 5,546,071 A * | 8/1996 | Zdunich | ............ | 340/541 |
| 5,748,084 A * | 5/1998 | Isikoff | ............ | 340/568.1 |
| 6,133,830 A | 10/2000 | D'Angelo et al. | ............ | 340/571 |
| 6,628,200 B1 | 9/2003 | Lin | ............ | 340/568.1 |
| 6,661,340 B1 | 12/2003 | Saylor et al. | ............ | 340/517 |
| 6,725,379 B1 * | 4/2004 | Dailey | ............ | 726/35 |
| 7,027,808 B2 * | 4/2006 | Wesby | ............ | 455/419 |
| 7,129,833 B2 * | 10/2006 | Albert | ............ | 340/521 |
| 2005/0250468 A1 * | 11/2005 | Lu et al. | ............ | 455/403 |

FOREIGN PATENT DOCUMENTS

WO    WO 2004/042669 A1    5/2004

\* cited by examiner

*Primary Examiner*—Pramila Parthasarathy
(74) *Attorney, Agent, or Firm*—K & L Gates LLP

(57) ABSTRACT

A security apparatus using a telecommunication device is disclosed. A telephone microprocessor is used for sending a predefined security message to a security telephone number preprogrammed in the telecommunication device. A sensing device associated with the telecommunication device is used for detecting an undesired activity around or in association with the telecommunication device. The sensing device directs the telephone microprocessor to send the predefined security message to alert the undesired activity.

16 Claims, 5 Drawing Sheets

SECURITY APPARATUS USING A TELECOMMUNICATION DEVICE

BACKGROUND

The present invention relates generally to security apparatus, and more particularly to the implementation of security system with a telecommunication device.

Theft of valuable small articles continues to be a problem for travelers, homeowners and apartment dwellers, who routinely utilize valuable items in the normal course of their daily activities. Wireless telephones, briefcases, luggage, portable computers, digital cameras, and other easily identifiable valuables make attractive targets for thieves.

Today, millions of handheld devices are in use throughout the world. That number is expected to further increase dramatically in the next few years. Users of camera cell phones, laptops, and digital cameras should carefully guard their personal/business devices.

Anti-theft designs have varied in detail but typically consist of different combinations of motion or separation detectors, signaling devices for remote control, and alarm devices. For example, one prior art system includes an alarmed luggage strap that triggers an alarm when a would-be thief opens a carrying case or luggage article encircled by the luggage strap. However, the device does not prevent the carrying case from being removed from the premises before opening. Several known devices trigger an alarm when two units—a transmitter unit and a detector unit—are separated by more than a preset distance. This luggage alarm device triggers an alarm at the control unit located with the owner, when the owner is separated from the luggage. Alarm devices based on separation devices do not distinguish between separation caused by movement of the protected article and separation as a result of the owner walking away temporarily. To protect against an article being removed by a thief, the separation distance over and above which an alarm occurs should be set as short as practical. However, for these devices to be convenient for routine travel, the distance over and above which the alarm occurs must be fairly large to avoid false alarms. Therefore, with separation distance-based alarm devices, a theft attempt may not be detected until the protected article has been more than a considerable distance from the owner.

Other known devices trigger an alarm when a motion sensing device detects movement of the protected article. Unlike the devices based on separation distance, motion sensing devices respond to an attempted theft instantaneously when the protected device is moved, but prior art motion sensing devices are prone to false alarms because they do not distinguish between motion caused by the owner or a motion caused by a theft.

Desirable in the art of anti-theft alarm wireless systems are new low-cost designs that provide a portable security system for protection of the wireless telephone and other valuables.

SUMMARY

In view of the foregoing, this invention provides circuit and method for a low cost portable wireless security system through the incorporation of at least one sensing device such as a motion detector within a wireless telephone. A telephone microprocessor is used for sending a predefined security message to a security telephone number preprogrammed in the telecommunication device. A sensing device associated with the telecommunication device is used for detecting an undesired activity around or in association with the telecommunication device. The sensing device directs the telephone microprocessor to send the predefined security message to alert the undesired activity.

The construction and method of operation of the invention, however, together with additional objects and advantages thereof will be best understood from the following description of specific embodiments when read in connection with the accompanying drawings Although the invention is illustrated and described herein as embodied in a circuit and method for a portable wireless security system through the incorporation of one or a plurality of sensing devices within a wireless telephone, it is nevertheless not intended to be limited to the details shown, since various modifications and structural changes may be made therein without departing from the spirit of the invention and within the scope and range of equivalents of the claims.

DESCRIPTION

The following provides at least one sensing device interfaced with a telecommunication device, such as a wireless telephone. When a security mode is activated and an undesired activity is detected, a preprogrammed number is silently dialed such that an alarm is transmitted to an authorized party. For purposes of illustration, a motion detector is used as an example of the sensing device, but it is understood that various other sensing devices can be used as well.

Figure 1:
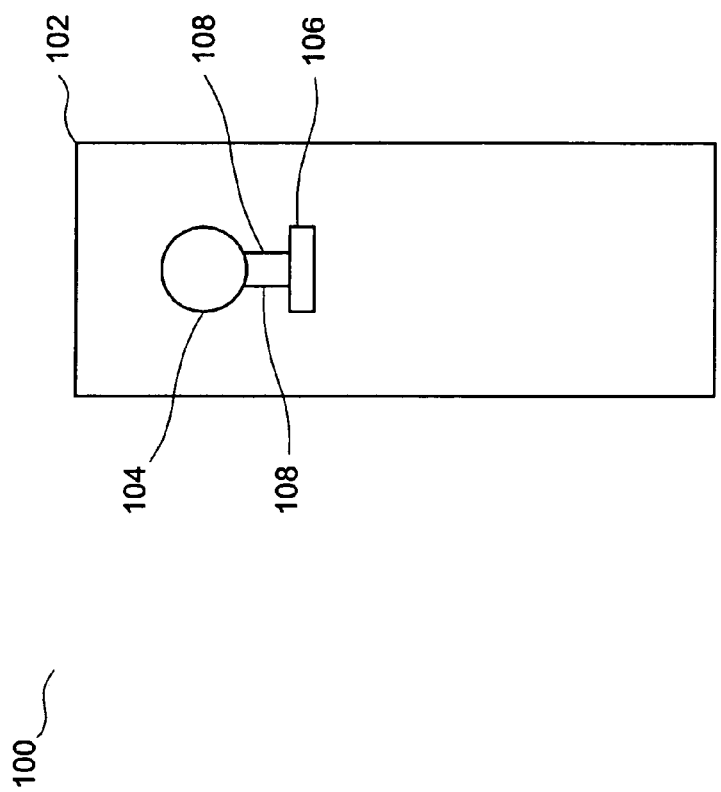
FIG. 1 presents a schematic of a telecommunication device with a physical motion detector in accordance with a first embodiment of the present invention.

FIG. 1 presents a schematic 100 of a telecommunication device, such as a wireless telephone and personal digital assistant (PDA), 102 with a physical motion detector 104 in accordance with one embodiment of the present invention. A telecommunication device may include telecommunication devices that may wirelessly complete data/voice transaction to and from one or more servicing stations of a telecommunication provider. The provider's servicing station include a plurality of equipment, including base stations and multiplexers that are necessary to facilitate such a wireless transaction.

The physical motion detector 104 monitors the physical motion of the telecommunication device when the security mode of the telecommunication device 102 is activated. The physical motion detector 104 could be an accelerometer or other device that is connected to a telephone microprocessor 106 via lines 108. When physical movement of the telecommunication device 102 is sensed by the accelerometer, an "ON" signal is generated and sent to the microprocessor mobile device call processing software that generates an interrupt on one of the general purpose input output (GPIO) lines. If the security mode is activated, and a valid security phone number is preprogrammed, the interrupt signal will cause a priority microprocessor interrupt, during which a preprogrammed SMS (short message service) text message or voice message is silently and discreetly sent to the security phone number to alert the owner or authorized personnel of a potential security problem. The physical motion detector 104 installed in associated with the telecommunication device 102 can provide security for the same and other valuables, if left in a trunk of a parked automobile by alerting the owner or authorized personnel when the automobile is moved without permission. This portable security feature can be implemented into conventional telecommunication devices with little additional cost.

Figure 2B:
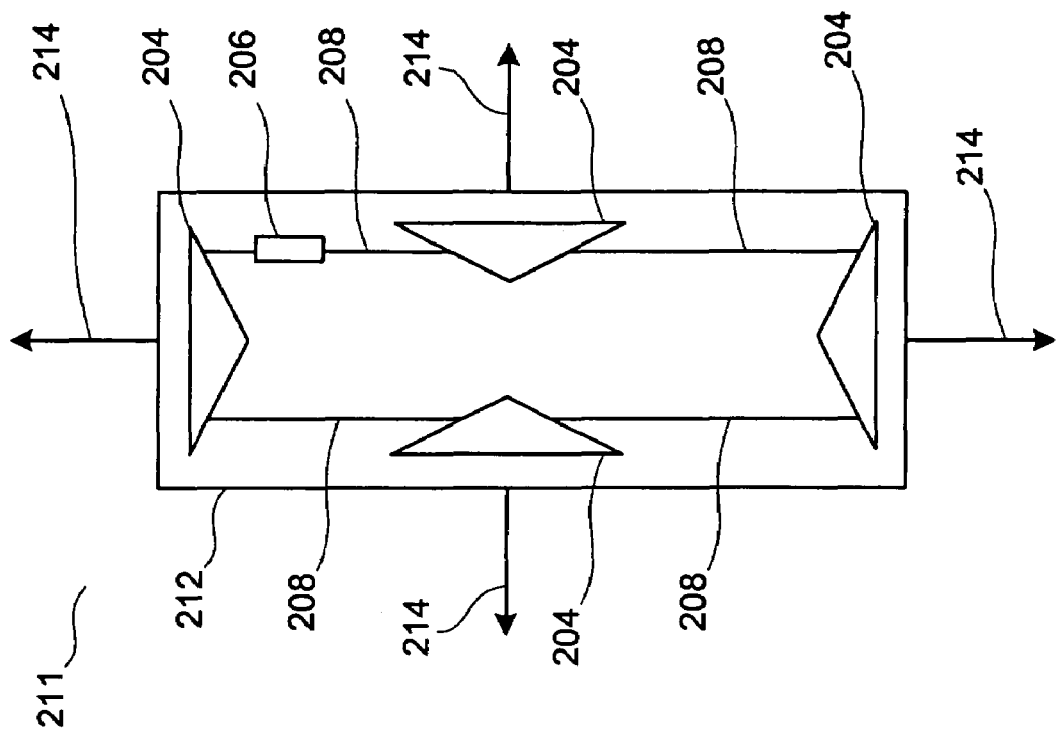
FIG. 2B presents a schematic of a telecommunication device with a plurality of directional motion detectors in accordance with a third embodiment of the present invention.
Figure 2A:
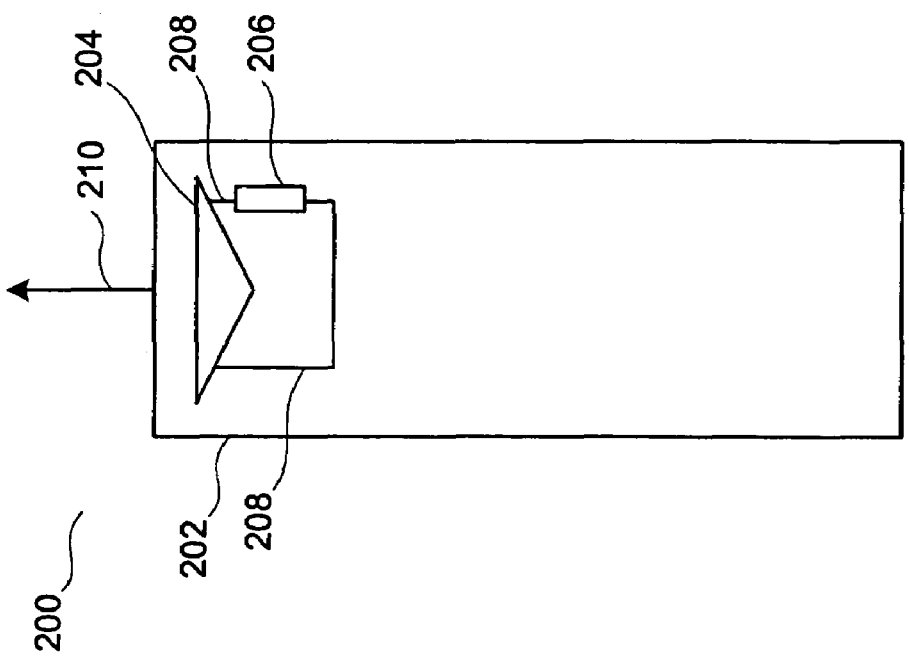
FIG. 2A presents a schematic of a telecommunication device with a directional motion detector in accordance with a second embodiment of the present invention.

FIG. 2A presents a schematic 200 of a telecommunication device 202 with a directional motion detector 204 in accordance with another embodiment of the present invention. The directional motion detector 204 typically detects motion within a specific angular range. For example, the directional motion detector 204 may be a detector capable of detecting an angular range of 90 degrees along the horizon and 45 degrees orthogonal to the horizon, or a 90-by-45-degree "field of view". The directional motion detector 204 is installed into the telecommunication device 202 to monitor movement within a confined space. This confined space may be a hotel room, room in an apartment or home, car occupant area etc., which in turn may contain other valuables for which the owner desires portable security protection from unauthorized entry. The directional motion detector 204 is connected to a telephone microprocessor 206 of the telecommunication device 202 via lines 208. In this embodiment, the telecommunication device 202 has a directional motion detector 204 that senses motion in one direction within its "field of view." The directional motion detector 204 may be integrated almost anywhere within or on the phone housing. In this case, the directional motion detector 204 provides security protection in the direction specified by an arrow 210.

Motion is detected within the confined space by the directional motion detector 204, if the movement is within its "field of view." An "ON" signal is generated by the directional motion detector 204 and is sent to the microprocessor mobile device call processing software. If the security mode is activated, and a valid security phone number is preprogrammed, the interrupt signal will cause a priority microprocessor interrupt on one of the general purpose input output (GPIO) lines and silently send a preprogrammed SMS (short message service) text message or voice message to the security phone number to alert the owner or authorized personnel of a potential security problem. This method provides security protection in one direction only, which may be inadequate in multiple access rooms or where windows are present. During normal operation of the telecommunication device, the security feature is normally turned off. This method provides a low cost solution to portable security protection. This security feature can also be implemented into conventional wired telephones by adding a unit that will store a voice alarm message and play the message to a preprogrammed alarm number.

FIG. 2B presents a schematic 211 of a telecommunication device 212 with a plurality of directional motion detectors 204 in yet another embodiment of the present invention. The directional motion detectors 204 monitor movement in a 360-degree circumference within a confined space, which may be a hotel room, a room in an apartment or a home, a car occupant area etc. The confined space may contain other valuables for which the owner desires portable security protection from unauthorized entry. The four directional motion detectors 204 are connected in series to each other via lines 208 and terminate at the telephone microprocessor 206. In this embodiment, the telecommunication device 212 has four directional motion detectors 204 that sense motion in one of four directions (with each covering approximately 90 degrees) to provide full 360-degree security protection by combining each of the four detector's "field of view". The motion detectors can be mounted most anywhere inside or on the phone housing. In this case, the four directional motion detectors provide security protection in the directions specified by the four arrows 214. The process of generating the processor interrupt signal, and subsequent text or voice alarm message to the owner is identical to that described in FIG. 1 and FIG. 2A. During normal operation of the wireless telephone, the security feature is normally turned off. This security feature can also be implemented into conventional wired telephones by adding a unit that will store a voice alarm message and play the message to a preprogrammed alarm number.

Figure 3:
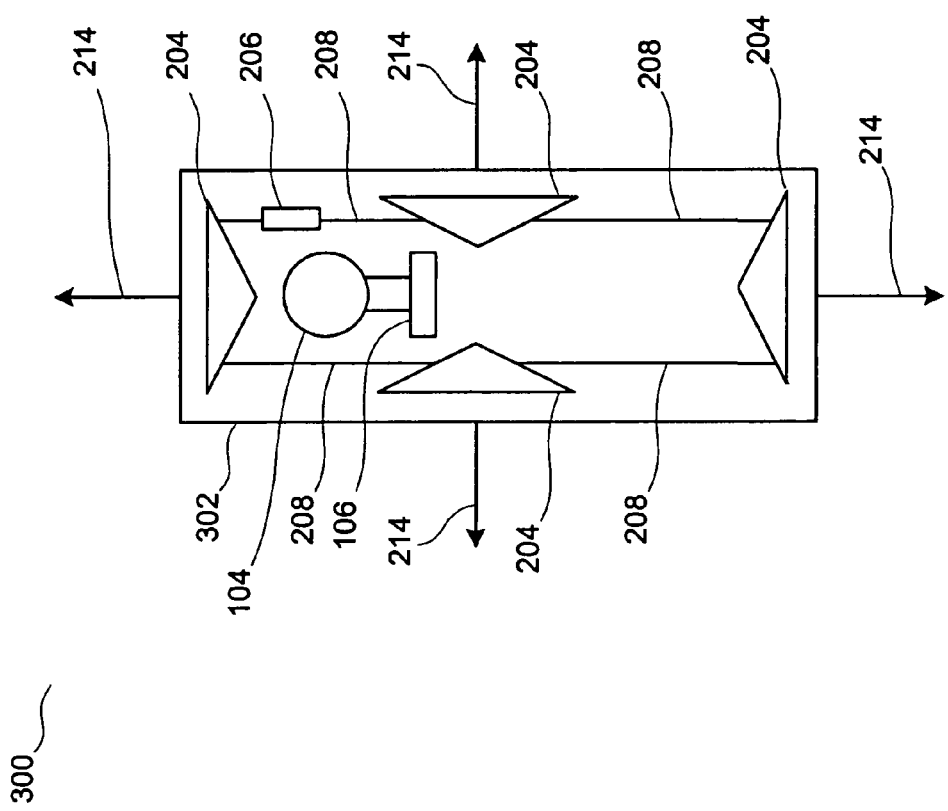
FIG. 3 presents a schematic of a telecommunication device with a physical motion detector and a plurality of room motion detectors in accordance with a fourth embodiment of the present invention.

FIG. 3 presents a schematic 300 of a telecommunication device 302 with a physical motion detector 104 and a plurality of directional motion detectors 204 that monitor the physical movement of the telecommunication device 302, and detect movement in a 360-degree circumference (as shown by the four arrows 214) within a confined space as another embodiment of this invention. The physical motion detector 104 communicates to the telephone microprocessor 106 as explained in FIG. 1. The four directional motion detectors 204 are connected in series via a plurality of lines 208 and communicate with the telephone microprocessor 206 as explained in FIG. 2B. Thus, the telecommunication device 302 with both the physical motion detector 104 and the directional motion detectors 204 provide an ideal device for portable security protection. If the telecommunication device 302 is physically moved, e.g. the lateral movement that is sensed by an activated telecommunication device left in a car trunk, as described earlier, the telecommunication device 302 will route a preprogrammed text or voice message to the alert phone number. As well, if movement is detected within a confined space (360 degrees around the telephone), the telecommunication device 302 will route a preprogrammed text or voice message to the alert phone number. During normal operation of the telecommunication device, the security feature is turned off.

It is understood that the telecommunication device 302 may use one or more telephone microprocessor to perform the functions of the telephone microprocessors 106 and 206. The number of the telephone microprocessors may vary depending on deign requirements.

Figure 4:
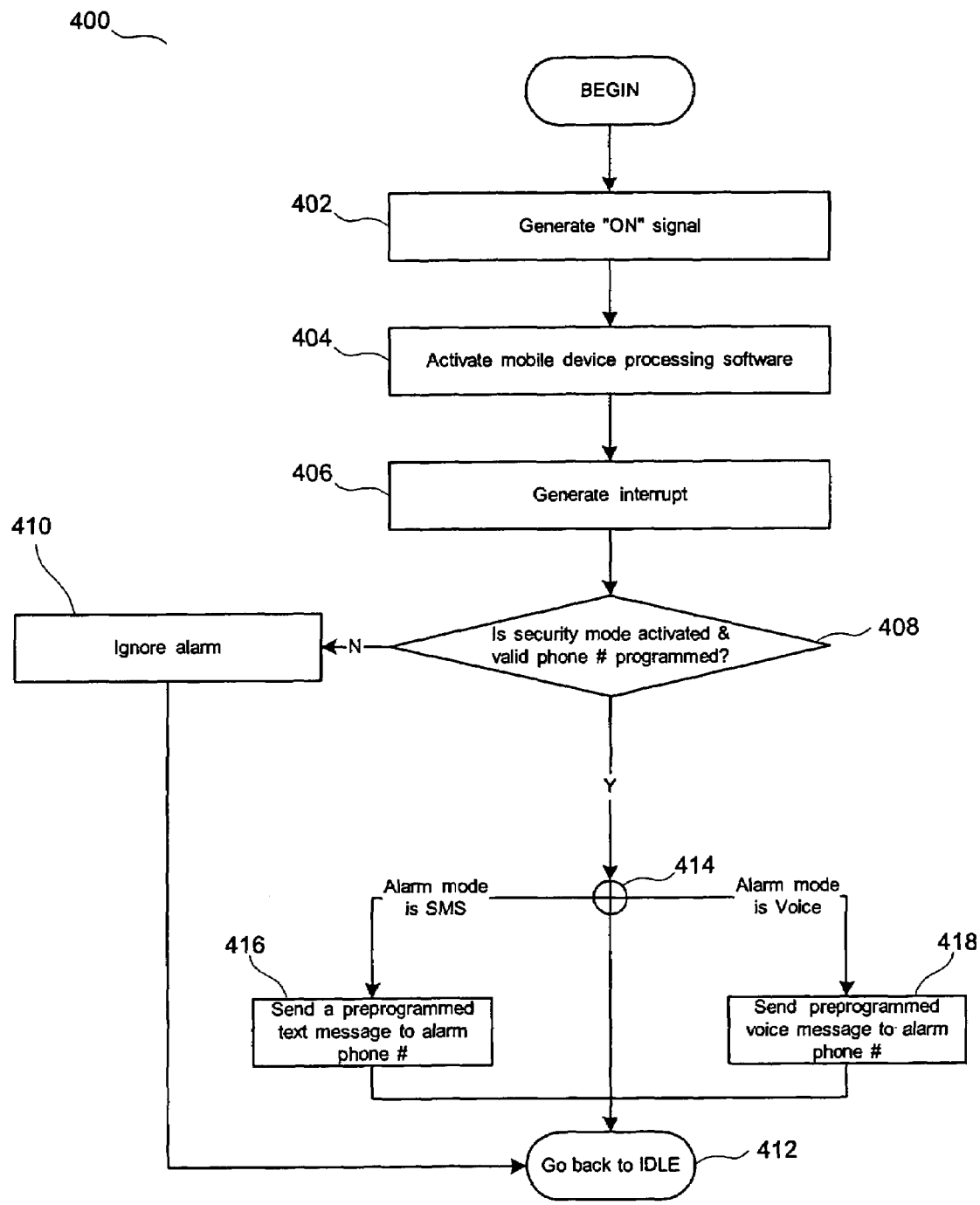
FIG. 4 presents a flow diagram illustrating the motion detection interrupt software routine in accordance with one embodiment of the invention.

FIG. 4 presents a flow diagram 400 illustrating the motion detection interrupt software routine, according to one embodiment of the present invention. This software flow identifies the sequence of steps from the initiation of the physical motion detection and/or space motion detection through the software steps to generate a microprocessor interrupt that sends a text message or voice message to the preprogrammed alert phone number for notification of the owner or authorized personnel. When either a physical movement of the telecommunication device or motion is detected within a confined space (room, automobile occupant area, etc), an "ON" signal is generated by the motion detector in step 402. In step 404, the main functions of the mobile device call processing software is activated and, in step 406, the mobile device call processing software generates an interrupt on one of the GPIO lines. In decision box 408, the mobile device call processing software verifies that the security mode is activated and that a valid alert phone number is preprogrammed into the telecommunication device. If either the security mode is not activated or no alert phone number has been pre-programmed, the flow proceeds to step 410, where the mobile device call processing software ignores the alarm interrupt, and then to step 412, where the flow ends for the interrupt software routine. If, however, both conditions are met, then the flow proceeds to a junction 414, where the flow is properly routed according to the type of alarm mode (e.g. SMS, Voice etc.) the telecommunication device is programmed with. At this stage, the mobile device call processing software may wait for a preprogrammed duration before continuing the alarm process to allow the owner to enter a password and disable the alarm if in the event that the owner returns after an absence and wishes to disable the security system. If the alarm mode is SMS (short message service), then the flow proceeds to step 416, in which a preprogrammed text message is silently sent to the alarm phone number. If the alarm mode is voice, then the flow proceeds to 418, in which a preprogrammed voice message is sent silently to the alarm phone number. After either step 416 or 418, the flow ends at step 412. The telephone alarm is temporarily disabled from initiating a new alarm for a predetermined period to prevent multiple alarms from multiple motions sensed from a single intrusion. During normal operation of the telecommunication device, the security feature is normally turned off. When the telephone security alarm function is turned off, the microprocessor of the telephone is not interrupted.

Figure 5:
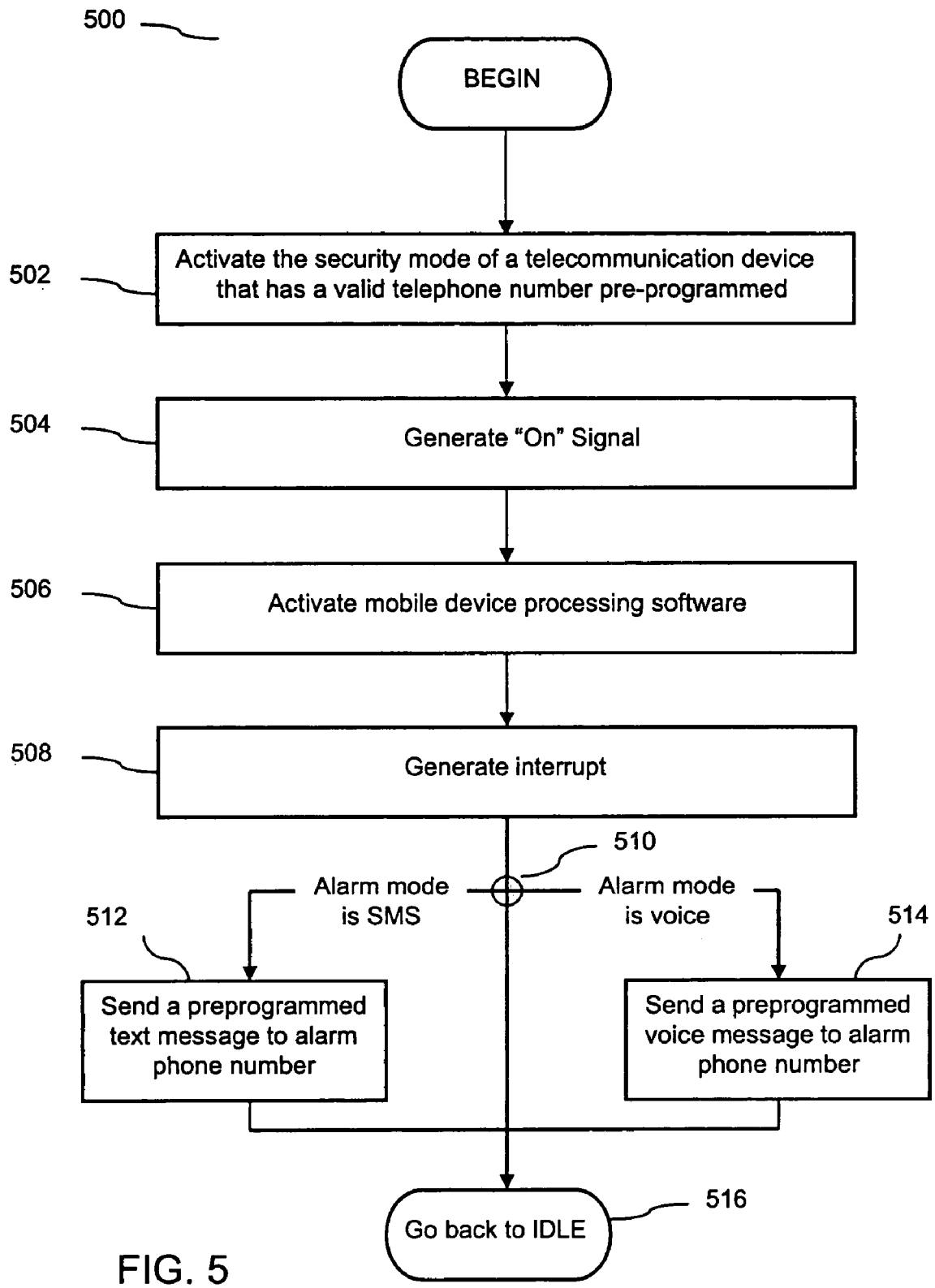
FIG. 5 presents a flow diagram illustrating the motion detection interrupt software routine in accordance with another embodiment of the invention.

FIG. 5 presents a flow diagram 500 illustrating the motion detection interrupt software routine, according to another embodiment of the present invention. In step 502, a security mode of a telecommunication device that has a valid preprogrammed alarm phone number is activated. When either a physical movement of the telecommunication device or motion is detected within a confined space (room, automobile occupant area, etc), an "ON" signal is generated by the motion detector in step 504. In step 506, the main functions of the mobile device call processing software is activated. In step 508, the mobile device call processing software generates an interrupt on one of the GPIO lines. The flow proceeds to a junction 510, where the flow is properly routed according to the type of alarm mode (e.g. SMS, Voice etc.) the communication device is programmed with. If the alarm mode is SMS (short message service), then the flow proceeds to step 512, in which a preprogrammed text message is silently sent to the alarm phone number. If the alarm mode is voice, then the flow proceeds to 514, in which a preprogrammed voice message is sent silently to the alarm phone number. After either step 512 or 514, the flow ends at step 516.

As it is understood that the motion detector is only one example of the sensing device integrated with the wireless telecommunication device. Other sensing devices, such as a smoke detector, temperature/thermal sensor, alcohol detector, and carbon monoxide level detector, can all be used replacing or along with the motion detector. For example, a cell phone incorporated with an alcohol detector can detect the level of alcohol concentration as the user speaks to the cell phone. When it has reached a certain level, an alert message may be sent to an authorized party, who may call the cell phone user to warn him his current condition. In short, with a sensing device integrated with the telecommunication device, any undesired activity around or in association with the telecommunication device can be detected, which further triggers an alert communication session to be established with an authorized party.

The above invention provides many different embodiments or examples for implementing different features of the invention. Specific examples of components and processes are described to help clarify the invention. These are, of course, merely examples and are not intended to limit the invention from that described in the claims.

Although the invention is illustrated and described herein as embodied in a design and method for the implementation of motion sensing security apparatus into a wireless telephone, it is nevertheless not intended to be limited to the details shown, since various modifications and structural changes may be made therein without departing from the spirit of the invention and within the scope and range of equivalents of the claims. Accordingly, it is appropriate that the appended claims be construed broadly and in a manner consistent with the scope of the invention, as set forth in the following claims.

What is claimed is:

1. A security apparatus using a telecommunication device comprising:
   a telephone microprocessor implemented in the telecommunication device and configured with a security mode and a preprogrammed security phone number;
   a sensing device interfaced with the telephone microprocessor, wherein the sensing device comprises at least one directional motion detector coupled to the telephone microprocessor, and arranged in a manner capable of detecting a movement with an angular range of predetermined degree, and collaboratively constituting an enlarged angular range of multiple of the predetermined degrees for monitoring the movement of the telecommunication device;
   wherein when the security mode is on and the sensing device is triggered in response to a predetermined security setting, a priority microprocessor interrupt on one of the general purpose input output (GPIO) lines of the telephone microprocessor is triggered, causing a preprogrammed message silently and discreetly sent to the preprogrammed security phone number.

2. The new security apparatus of claim 1, wherein the at least one directional detector is an accelerometer.

3. The security apparatus of claim 1, wherein the sensing device is a smoke detector.

4. The security apparatus of claim 1, wherein the sensing device is an alcohol detector.

5. The security apparatus of claim 1, wherein the telecommunication device is a wireless phone, a personal digital assistant (PDA), or a mobile phone.

6. The security apparatus of claim 1 wherein the preprogrammed message is a text message.

7. The security apparatus of claim 1 wherein the preprogrammed message is a voice message.

8. A security apparatus using a telecommunication device comprising:
   a telephone microprocessor implemented in the telecommunication device and configured with a security mode and a preprogrammed security phone number;
   at least one directional motion detector coupled to the telephone microprocessor, and arranged in a manner capable of detecting a movement within an angular range of a predetermined degree, and collaboratively constituting an enlarged angular range of multiple of the predetermined degrees for monitoring a movement of the telecommunication device;
   wherein when the security mode is on and the at least one directional motion detector detects a movement of the telecommunication device, a priority microprocessor interrupt on one of the general purpose input output (GPIO) lines of the telephone microprocessor is triggered, causing a preprogrammed message silently sent to the preprogrammed security phone number.

9. The security apparatus of claim 8, wherein the at least one directional motion detector is an accelerometer.

10. The security apparatus of claim 8, wherein the preprogrammed message is a text message.

11. The security apparatus of claim 8, wherein the preprogrammed message is a voice message.

12. The security apparatus of claim 8, wherein the telecommunication device is a wireless phone, a personal digital assistant (PDA), or a mobile phone.

13. An anti-theft method comprising:
providing a telephone microprocessor of a telecommunication device;
configuring the telephone microprocessor with a security mode and a preprogrammed security phone number;
providing at least one directional motion detector coupled to the telephone microprocessor for monitoring a movement of the telephone devices, and arranged in a manner capable of detecting a movement with an angular range of predetermined degree, and collaboratively constituting an enlarged angular range of multiple of the predetermined degrees for monitoring the movement of the telecommunication device;
triggering a priority microprocessor interrupt on one of the general purpose input output (GPIO) lines of the telephone microprocessor when the security mode is on and the at least one directional motion detector detects a movement of the telecommunication device; and
sending a preprogrammed message silently and discreetly sent to the preprogrammed security phone number.

14. The anti-theft method of claim 13, wherein the telecommunication device is a wireless phone, a mobile phone, or a personal digital assistant (PDA).

15. The anti-theft method of claim 13, wherein the at least one directional motion detector is an accelerometer.

16. The anti-theft method of claim 13, further comprising the step of:
ignoring the interrupt signal when the security mode is off.

* * * * *

UNITED STATES PATENT AND TRADEMARK OFFICE
CERTIFICATE OF CORRECTION

PATENT NO. : 7,531,007 B2  Page 1 of 1
APPLICATION NO. : 10/886420
DATED : May 12, 2009
INVENTOR(S) : Bettadapura Srinath Sharma It is certified that error appears in the above-identified patent and that said Letters Patent is hereby corrected as shown below:

On the Title Page, should read
Item (73)   Assignee:   VIA Telecom Co., Ltd.

Signed and Sealed this

Twenty-ninth Day of September, 2009

David J. Kappos
*Director of the United States Patent and Trademark Office*